United States Patent
Blythe et al.

(10) Patent No.: US 9,228,537 B2
(45) Date of Patent: Jan. 5, 2016

(54) METHOD AND SYSTEMS FOR A PASSAGEWAY BLOCK

(71) Applicant: General Electric Company, Schenectady, NY (US)

(72) Inventors: Neil Xavier Blythe, North East, PA (US); Harsha Vardhana, Bangalore (IN)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 13/886,456

(22) Filed: May 3, 2013

(65) Prior Publication Data
US 2014/0325984 A1 Nov. 6, 2014

(51) Int. Cl.
*F02B 37/00* (2006.01)
*F02M 25/07* (2006.01)

(52) U.S. Cl.
CPC ....... *F02M 25/0711* (2013.01); *F02M 25/0726* (2013.01); *F02M 25/0737* (2013.01); *Y02T 10/121* (2013.01); *Y10T 137/85938* (2015.04)

(58) Field of Classification Search
CPC .............. F02M 25/0711; F02M 25/0726
USPC .................... 60/599, 605.2, 612; 123/562
See application file for complete search history.

(56) References Cited

U.S. PATENT DOCUMENTS

| | | | | |
|---|---|---|---|---|
| 2,476,908 A * | 7/1949 | Radcliffe | ........................ | 138/39 |
| 6,435,205 B1 | 8/2002 | Hattori et al. | | |
| 6,550,815 B2 * | 4/2003 | Zitkowic et al. | ........... | 285/120.1 |
| 6,945,269 B2 | 9/2005 | Hattori et al. | | |
| 2005/0082822 A1 * | 4/2005 | Menard | ........................... | 285/93 |
| 2010/0276925 A1 * | 11/2010 | Bareiss et al. | ............. | 285/125.1 |
| 2011/0088672 A1 * | 4/2011 | Prior et al. | ............... | 123/568.12 |

FOREIGN PATENT DOCUMENTS

EP 2511510 * 10/2012 ............. F02M 35/10

* cited by examiner

*Primary Examiner* — Jesse Bogue
*Assistant Examiner* — Vikansha Dwivedi
(74) *Attorney, Agent, or Firm* — GE Global Patent Operation; John A. Kramer

(57) ABSTRACT

Various methods and systems are provided for flowing fluid through a passageway block. In one embodiment, a passageway block comprises a first passage and a second passage, each of the first passage and the second passage including inlets and outlets to the passageway block, none of the inlets and outlets being concentric with one another; but within the passageway block, for at least a portion, a third passage concentrically surrounds the second passage.

18 Claims, 6 Drawing Sheets

METHOD AND SYSTEMS FOR A PASSAGEWAY BLOCK

FIELD

Embodiments of the subject matter disclosed herein relate to an engine, engine components, and an engine system, for example.

BACKGROUND

Engines may utilize recirculation of exhaust gas from an engine exhaust system to an engine intake system, a process referred to as exhaust gas recirculation (EGR), to reduce regulated emissions. Additionally, engines may utilize one or more turbochargers to increase the power provided by the engine. Turbochargers function by compressing intake air in a compressor via a turbine operated by exhaust gas flow. In one example, various flow passages may connect the EGR system, a high pressure turbocharger, and a low pressure turbocharger. As such, a large number of components and joints may be required in such an engine system. The large number of components may increase engine system costs, along with increasing the potential for exhaust leaks.

BRIEF DESCRIPTION

In one embodiment, a passageway block comprises a first passage and a second passage. Each of the first passage and the second passage includes inlets and outlets to the passageway block. None of the inlets and outlets are concentric with one another, but within the passageway block, for at least a portion, a third passage at least partially concentrically surrounds the second passage.

In one example, the passageway block may be installed in an engine system with exhaust gases and engine cooling fluid passing through the passages of the passageway block from one engine system component to another. As such, multiple exhaust flow passages within the engine system may be combined into the passageway block. In this way, the passageway block may reduce the number of engine system components and subsequently reduce exhaust leaks.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of a passageway block. The passageway block includes a plurality of passages with inlets and outlets to the passageway block. In one example, the passageway block includes four passages, which may be flow passages, with each passage having a unique inlet and outlet to the passageway block. A first passage has a central axis positioned closer to an exterior of the passageway block than a central axis of a second passage. Three of the four passages are at least partially concentric passages. For example, the passages may be fully concentric (at 360 degrees), partially concentric (at less than 360 degrees), or some passages may be fully concentric and others partially concentric. As such, for at least a portion within the passageway block, a fourth passage surrounds a third passage and the third passage surrounds the second passage.

In one embodiment, the passageway block may be installed in an engine system. As such, various exhaust flow passages or paths are coupled to the passageway block. For example, exhaust gases from an exhaust manifold of the engine to a high pressure turbine may flow through the first passage. Exhaust gases flowing from the high pressure turbine to a low pressure turbine may flow through the second passage. Exhaust gases flowing from an exhaust gas recirculation (EGR) passage to an EGR cooler may flow through a third passage. Finally, engine coolant (e.g., cooling water, antifreeze, combinations thereof, or the like) flowing from the engine to an engine coolant radiator may flow through the fourth passage. Since the second, third, and fourth passages are concentric with one another, heat transfer may occur between the fluids flowing through these passages. In some cases, this may increase the turbocharging and cooling efficiency of the engine. Further, the passageway block may allow for a reduction in the number of engine system components and exhaust leaks.

The approach described herein may be employed in a variety of systems having multiple flow inputs and outputs. As one example, the device or passageway block may be used in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a powered rail vehicle (e.g., locomotive) is provided as an example of a mobile platform supporting a system incorporating an embodiment of the invention.

Figure 1:
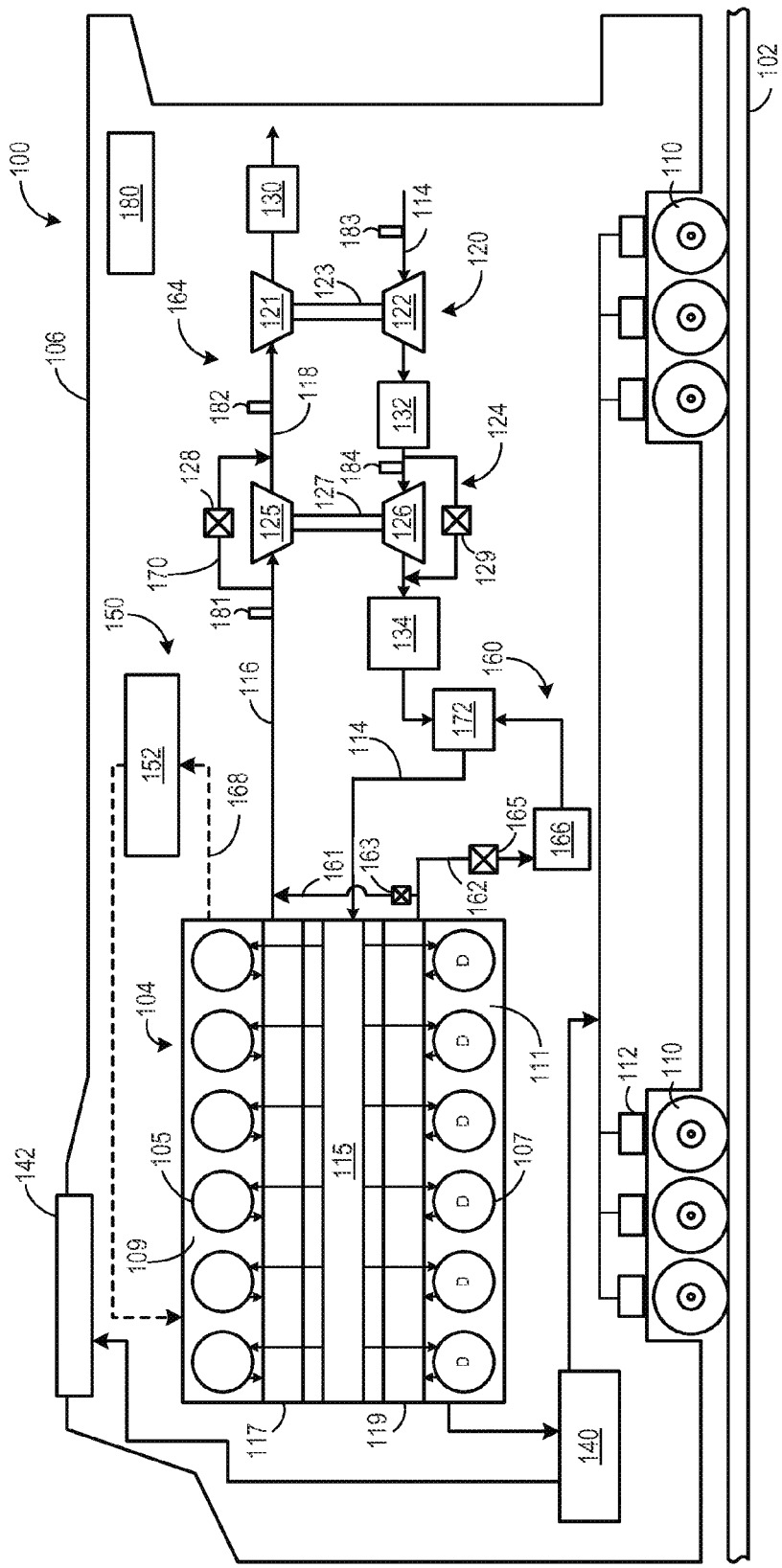
FIG. 1 shows a schematic diagram of a rail vehicle with an engine according to an embodiment of the invention.

Before further discussion of the passageway block, an example of a platform is disclosed in which the passageway block within an engine system may be installed in a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust flow path 164. The exhaust, or exhaust flow path 164, may be any suitable conduit through which gases flow from the engine. For example, the exhaust may include an exhaust manifold 117, an exhaust passage 116, an interstage passage 118, and the like. Exhaust gas flows through the exhaust passage 116, through the interstage passage 118, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. The non-donor cylinders 105 are part of a first cylinder bank 109 and the donor cylinder 107 are part of a second cylinder bank 111 of the engine 104. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust flow path 164 to route exhaust gas from the engine to atmosphere (after it passes through an exhaust gas treatment system 130 and first and second turbochargers 120 and 124). Specifically, the non-donor cylinders 105 are coupled to the exhaust passage 116 to route exhaust gas from the engine to a second turbocharger 124. The donor cylinders 107, which provide engine exhaust gas recirculation (EGR), are coupled exclusively to an EGR passage 162 of an EGR system 160 which routes exhaust gas from the donor cylinders 107 to an EGR cooler 166. Exhaust gases then flow from the EGR cooler 166 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as the EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, the EGR system 160 includes an EGR bypass passage 161 that is configured to divert exhaust from the donor cylinders back to the exhaust passage 116. The EGR bypass passage 161 may be controlled via an EGR bypass passage valve 163. The EGR bypass valve 163 may be configured with a plurality of restriction points such that a variable amount of exhaust is routed to the exhaust, in order to provide a variable amount of EGR to the intake.

The EGR system also includes an EGR valve 165 control the EGR flow through the EGR passage 162. Thus, the EGR system 160 may selectively route exhaust to the intake through the EGR valve 165 or to the exhaust passage through the EGR bypass valve 163. For example, when the EGR valve 165 is open, exhaust may be routed from the donor cylinders to the EGR cooler 166 and/or additional elements prior to being routed to the intake passage 114. Likewise, when the EGR bypass valve 163 is open, exhaust may be routed from the donor cylinders to the exhaust passage 116.

The EGR valve 165 and the EGR bypass valve 163 may be on/off valves controlled by the control unit 180 (for turning the flow of EGR on or off), or they may control a variable amount of EGR, for example. As such, the valves may be adjusted into a plurality of positions between fully open and fully closed. In some examples, the EGR bypass valve 163 may be actuated such that an EGR amount is reduced (exhaust gas flows through the EGR bypass passage 161 to the exhaust passage 116). For example, the opening of the EGR bypass valve 163 may be increased, thereby increasing the flow of exhaust from the donor cylinders to the exhaust passage 116. In other examples, the EGR bypass valve 163 may be actuated such that the EGR amount is increased (e.g., exhaust gas flows from the donor cylinder exhaust manifold 119 to the EGR passage 162). For example, the opening of the EGR bypass valve 163 may be decreased, thereby reducing flow to the exhaust passage 116.

In such a configuration, the EGR bypass valve 163 is operable to route exhaust from the donor cylinders to the exhaust passage 116 of the engine 104 and the EGR valve 165 is operable to route exhaust from the donor cylinders to the intake passage 114 of the engine 104. In the embodiment shown in FIG. 1, the EGR bypass valve 163 and the EGR valve 165 may be engine oil, or hydraulically, actuated valves, for example, with a shuttle valve (not shown) to modulate the engine oil. In some examples, the valves may be actuated such that one of the EGR bypass valve 163 and the EGR valve 165 is normally open and the other is normally closed. In other examples, the EGR bypass valve 163 and the EGR valve 165 may be pneumatic valves, electric valves, or another suitable valve.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust flow path 164 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust flow path 164 to a location upstream of the turbochargers 120 and 124 in the intake passage 114.

As depicted in FIG. 1, the vehicle system 100 further includes a two-stage turbocharger with a first turbocharger 124 and a second turbocharger 120 arranged in series, each of the turbochargers 124 and 120 arranged between the intake passage 114 and the exhaust flow path 164. The two-stage turbocharger increases air charge of ambient air drawn into the intake passage 114 in order to provide greater charge density during combustion to increase power output and/or engine-operating efficiency. The second turbocharger 120 operates at a relatively lower pressure, and includes a second turbine 121 which drives a second compressor 122. The second turbine 121 and the second compressor 122 are mechanically coupled via a second shaft 123. The second turbocharger 120 may be referred to the "low-pressure stage" of the turbocharger. Herein, the second turbocharger 120 may be referred to as the low pressure turbocharger (e.g., LPTC) and the second turbine 121 may be referred to as the low pressure turbine. The first turbocharger 124 operates at a relatively higher pressure, and includes a first turbine 125 which drives a first compressor 126. The first turbocharger 124 may be referred to the "high-pressure stage" of the turbocharger. Herein, the first turbine 125 may be referred to as the high pressure turbine and the first turbocharger 124 may be referred to as the high pressure turbocharger (e.g., HPTC). The first turbine 125 and the first compressor 126 are mechanically coupled via a first shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, or the like. In one example, three turbochargers are used in series. In another example, only two turbochargers are used in series.

In the embodiment shown in FIG. 1, the first turbocharger 124 is provided with a turbine bypass valve 128 which allows exhaust gas to bypass the first turbocharger 124 through a turbine bypass passage 170. The turbine bypass passage 170 is coupled between the exhaust passage 116 and the interstage passage 118. As such, the turbine bypass valve 128 may be opened, for example, to divert the exhaust gas flow away from the first turbine 125. In this manner, the rotating speed of the first compressor 126, and thus the boost provided by the turbochargers 120, 124 to the engine 104 may be regulated during steady state conditions. Additionally, the second turbocharger 120 may also be provided with a turbine bypass valve. Additionally, the first turbocharger may be provided with a compressor bypass valve 129, which allows gas to bypass the first compressor 126 to avoid compressor surge, for example. In some embodiments, the second turbocharger 120 may also be provided with a compressor bypass valve, while in other embodiments, only second turbocharger 120 may be provided with a compressor bypass valve.

The vehicle system 100 further includes an exhaust treatment system 130 coupled in the exhaust flow path 164 in order to reduce regulated emissions. As depicted in FIG. 1, the exhaust gas treatment system 130 is disposed downstream of the second turbine 121 of the second (low pressure) turbocharger 120. In other embodiments, an exhaust gas treatment system may be additionally or alternatively disposed upstream of the second turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

As depicted in FIG. 1, the vehicle system 100 further includes an engine cooling system 150. The engine cooling system 150 circulates water or other coolant through the engine 104 to absorb waste engine heat and distribute the heated coolant to a heat exchanger, such as a radiator 152. Coolant which is cooled by the radiator 152 enters the engine 104 to absorb heat and subsequently cool the engine. The warmed coolant then passes from the engine back to the radiator 152 through the coolant passage 168. As such, the coolant passage 168 transports coolant from the engine 104 to the radiator 152.

The vehicle system 100 further includes a control unit 180, which is provided and configured to control various components related to the vehicle system 100. Herein, the control unit 180 may also be referred to as the controller. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, turbine speed, or the like. Correspondingly, the control unit 180 may control the vehicle system 100 by sending commands to various components such as traction motors, alternator, cylinder valves, throttle, heat exchangers, wastegates or other valves or flow control elements, or the like.

As shown above in FIG. 1, a number of flow passages connects the EGR system, the high pressure turbocharger, the low pressure turbocharger, and the engine cooling system. As such, a large number of components and joints may be required in such an engine system. The large number of components may increase engine system costs, along with increasing the potential for exhaust leaks.

In one example, several of the flow paths and/or passages described above may be integrated into one fluid passage system, thereby reducing the number of joints and bellows in the engine system. As such, the fluid passage system may include a plurality of fluidic passages and may be incorporated into an engine system to connect various engine system components. One example of the fluid passage system may be a passageway block, described further below. The passageway block may include all or portions of various engine system fluid passages, such as the EGR bypass passage 161, the EGR passage 162, the exhaust passage 116, the interstage passage 118, the turbine bypass passage 170, and the coolant passage 168. In some examples, these passages may be coupled to the passageway block and/or pass through the passageway block.

Figure 2:
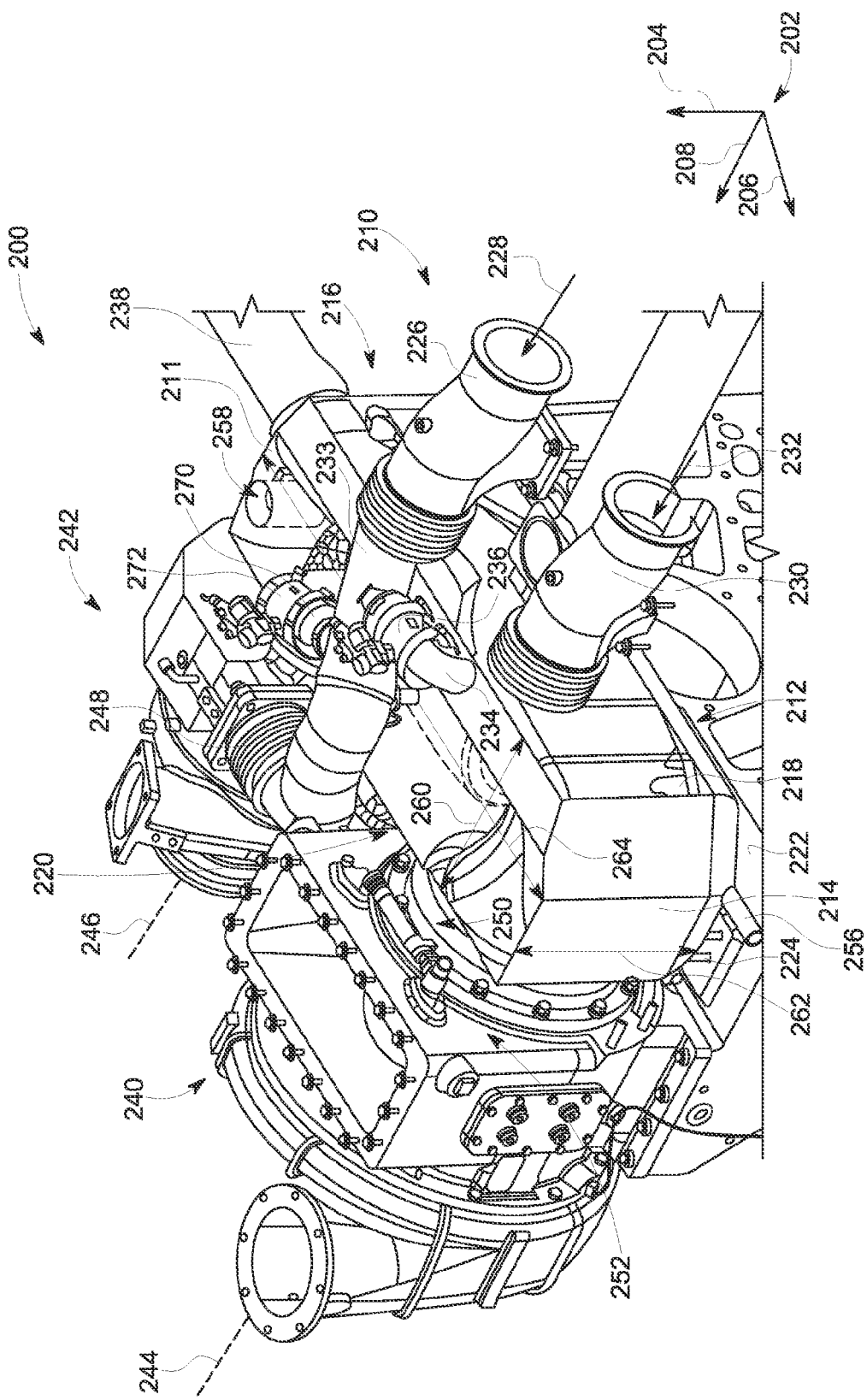
FIG. 2 shows a schematic of a passageway block installed in an engine according to an embodiment of the invention.

FIG. 2 shows a diagram 200 of a passageway block 210 installed in an engine system, such as the engine system 100 of FIG. 1. The passageway block 210 may also be referred to as a monolithic block. The diagram 200 includes a coordinate system 202 having a vertical axis 204, a horizontal axis 206, and a lateral axis 208. As shown in FIG. 2, the passageway block 210 has a generally rectangular prism-like shape with a plurality of walls or outer faces. In alternate embodiments, the passageway block 210 may not be rectangular. For example, the passageway block 210 may be cuboidal, elliptical, rounded, or the like. As such, in some examples, the sides or outer faces of the passageway block 210 may not be flat. In one example, the sides may be rounded. In another example, the passageway block 210 may have continuous surfaces with no defined walls. Further, the passageway block 210 may be a unitary block, formed in one piece. Additional passages, bypasses, and/or conduits may be coupled to the unitary or passageway block 210, as described further below.

In one example, as shown in FIG. 2, an outer surface of the passageway block 210 is defined by a first wall 211, a second wall 212 (hidden in FIG. 2), a third wall 216 (hidden in FIG. 2), a fourth wall 214, a fifth wall 218, and a sixth wall 220 (hidden in FIG. 2). In one example, as shown in FIG. 2, the first wall 211 is positioned opposite and vertically above, with respect to the vertical axis 204 and a surface on which the vehicle sits, the second wall 212. As such, the first wall 211 and the second wall 212 are parallel to one another. Further, the first wall 211 may be referred to as a top surface and/or top face while the second wall 212 may be referred to as a bottom surface and/or bottom face. Similarly, the fourth wall 214 and the third wall 216 may be side walls which are parallel to and opposite to one another. The fourth wall 214 may be referred to as a second side face and the third wall 216 may be referred to as a first side face. Finally, the fifth wall 218 and the sixth wall 220 may be side walls which are parallel to and opposite to one another. The fifth wall 218 may be referred to as a front face and the sixth wall 220 may be referred to as a back face. In this way, the passageway block 210 comprises three sets of opposite walls or faces. A first set of opposite faces comprise the front face (e.g., fifth wall 218) and the back face (e.g., sixth wall 220). A second set of opposite faces comprise the top face (e.g., first wall 211) and the bottom face (e.g., second wall 212). Finally, a third set of opposite faces comprise the first side face (e.g., third wall 216) and the second side face (e.g., fourth wall 214).

In one embodiment, as shown in FIG. 2, the passageway block 210 sits on a surface of an integrated front end (IFE) 222. In another embodiment, the passageway block 210 may sit on an engine block. As shown in FIG. 2, the passageway block 210 contacts a surface of the IFE 222 at the second wall 212. Further, the passageway block 210 is coupled to the IFE 222 through a plurality of bolts 224.

The fifth wall 218 or face of the passageway block 210 is positioned adjacent to one or more exhaust manifolds of the engine, such as the donor cylinder exhaust manifold 119 and the non-donor cylinder exhaust manifold 117 shown in FIG. 1. As described above with reference to FIG. 1, the donor cylinders 107 of the second cylinder bank 111 supply exhaust to the donor cylinder exhaust manifold 119 and the non-donor cylinders 105 of the first cylinder bank 109 supply exhaust to the non-donor exhaust manifold 117. Additionally, a first exhaust conduit 226 connects the non-donor cylinder exhaust manifold to the passageway block 210. In one example, the first exhaust conduit 226 forms a portion of the exhaust passage, such as the exhaust passage 116 shown in FIG. 1. As such, exhaust gas 228 flows from the non-donor cylinder exhaust manifold, through the first exhaust conduit 226, and into a first flow passage 233 of the passageway block (same as the first passage presented at FIGS. 3-8). Further, a second exhaust conduit 230 connects the donor cylinder exhaust manifold to the passageway block 210. In one example, the second exhaust conduit forms a portion of the EGR passage, such as the EGR passage 162 shown in FIG. 1. As such, exhaust gas 232 flows from the donor cylinder exhaust manifold, through the second exhaust conduit 230, and into a third flow passage of the passageway block (same as the third passage presented at FIGS. 3-8).

An EGR bypass passage 234 is coupled between the first flow passage 233 (at a fourth opening 316 of a first passage 318 described below and shown in FIG. 4 and FIG. 6) of the passageway block 210 and the third flow passage of the passageway block 210. The EGR bypass passage 234 may be the same as the EGR bypass passage 161 shown in FIG. 1. As such, the EGR bypass passage 234 may allow exhaust gas 232 to flow from the donor cylinder exhaust manifold and the second exhaust conduit 230, to the first flow passage 233 to join the flow of exhaust gas 228 from the non-donor cylinder exhaust manifold. An EGR bypass valve 236 is positioned within the EGR bypass passage 234 to control the flow of exhaust gas from the third flow passage to the first flow passage 233. The EGR bypass valve 236 may be controlled in the same fashion as the EGR bypass valve 163 as described above with reference to FIG. 1. In an alternate example, the EGR bypass passage 234 may be coupled between the second exhaust conduit 230 and the first flow passage 233. Specifically, the EGR bypass passage 234 is coupled to the first flow passage 233 through an opening (e.g., fourth opening 316) in the first flow passage 233 (described further below with reference to FIGS. 3-8).

A third exhaust conduit 238 is coupled to the passageway block 210 at the third wall 216. EGR flowing from the second exhaust conduit 230 and through the third flow passage exits the passageway block 210 through the third exhaust conduit 238. The EGR exhaust flow then flows downstream to an EGR cooler (such as EGR cooler 166 shown in FIG. 1).

The sixth wall 220 of the passageway block 210 is positioned adjacent to a low pressure turbocharger 240 (such as the low pressure turbocharger 120 shown in FIG. 1) and a high pressure turbocharger 242 (such as the high pressure turbocharger 124 shown in FIG. 1). As shown in FIG. 2, an axis 244 of the low pressure turbocharger 240 (e.g., low pressure turbocharger axis) is parallel to an axis 246 of the high pressure turbocharger 242 (e.g., high pressure turbocharger axis), both axes being along the lateral axis 208. Further, the axis 244 of the low pressure turbocharger 240 and the axis 246 of the high pressure turbocharger 242 are perpendicular to the sixth wall 220 of the passageway block 210.

A fourth exhaust conduit 248 connects the first flow passage 233 to the high pressure turbocharger 242. Specifically, the fourth exhaust conduit 248 is coupled to an inlet of a high pressure turbine (such as the high pressure turbine 125 shown in FIG. 1) of the high pressure turbocharger 242. A flow path of the fourth exhaust conduit 248 is perpendicular to the axis 246 of the high pressure turbocharger 242. Further, exhaust gas 228 flows through the first flow passage 233, through the fourth exhaust conduit 248, and into the inlet of the high pressure turbine of the high pressure turbocharger 242.

Exhaust gases flow through the high pressure turbine of the high pressure turbocharger 242 and then exits to enter a second flow passage (not shown in FIG. 2) within the passageway block 210. In one example, an additional exhaust conduit may couple an exit of the high pressure turbine to a first end of the second flow passage of the passageway block 210. A second end 250 of the second flow passage is coupled to an inlet 252 of a low pressure turbine (such as the low pressure turbine 121 shown in FIG. 1) of the low pressure turbocharger 240. A flow path at the second end 250 of the second flow passage is parallel to the axis 244 of the low pressure turbocharger 240. Further, exhaust gases flow from the high pressure turbine, through the second flow passage, and into the inlet 252 of the low pressure turbine. Finally, after traveling through the low pressure turbine, exhaust gases may exit the low pressure turbine to continue along an exhaust passage and exit the engine.

A turbine bypass passage 270 is coupled between the first flow passage 233 (at a third opening 314 of a first passage 318 described below at shown in FIG. 3) and the second flow passage of the passageway block 210. The turbine bypass passage 270 may be the same as the turbine bypass passage 170 shown in FIG. 1. As such, the turbine bypass passage 270 may allow exhaust gas 228 within the first flow passage 233 to flow from the first flow passage 233 to the second flow passage to join the flow of exhaust gas traveling from the high pressure turbine to the low pressure turbine. In one example, the turbine bypass passage 270 may be coupled to an additional exhaust conduit at the exit of the high pressure turbine, the additional exhaust conduit coupling the exit of the high pressure turbine to the first end of the second flow passage. A turbine bypass valve 272 is positioned within the turbine bypass passage 270 to control the flow of exhaust from the first flow passage 233 to the second flow passage, thus diverting exhaust gas flow away from the high pressure turbine of the high pressure turbocharger 242. The turbine bypass valve 272 may be controlled in the same fashion as the turbine bypass valve 128 described above with reference to FIG. 1.

Additionally, the passageway block 210 includes a coolant inlet conduit 256. Water or other coolant from an engine cooling system (such as the engine cooling system 150 shown in FIG. 1) exits the engine and enters a fourth flow passage (not shown in FIG. 2) within the passageway block 210 at the coolant inlet conduit 256. Coolant then flows through the inside of the passageway block 210, through the fourth flow passage, and exits the passageway block 210 at a coolant outlet opening 258. In one embodiment, a coolant outlet conduit may be coupled to the coolant outlet opening 258. The coolant outlet conduit may then be coupled to an engine coolant radiator (such as the radiator 152 shown in FIG. 1) of the engine cooling system.

As shown in FIG. 2, the passageway block 210 has a width 260 (along the lateral axis 208), a height 262 (along the vertical axis 204), and a length 264 (along the horizontal axis 206). The width 260 is defined such that the passageway block 210 fits between the low pressure turbocharger 240 and the high pressure turbocharger 242 and an edge of the IFE 222. In alternate embodiments, the width 260 may be shorter or longer than the width between the turbochargers and the edge of the IFE 222. The height 262 is smaller than a height of the high pressure turbocharger 242 and the low pressure turbocharger 240. In alternate embodiments, the height 262 may be greater than the height of the turbochargers. Finally, the length 264 is approximately a combined length of the high pressure turbocharger 242 and the low pressure turbocharger 240. In alternate embodiments, the length 264 may be larger or smaller than the combined length of the high pressure turbocharger 242 and the low pressure turbocharger 240. In this way, the size and shape of the passageway block 210 may be defined such that the passageway block 210 fits within the engine system between the engine components which are coupled to the passageway block (e.g., the turbochargers and the engine).

The system of FIGS. 1-2 may provide for an engine system including a first turbocharger with a first turbine; a second turbocharger with a second turbine positioned downstream from the first turbine of the first turbocharger; a first cylinder bank; a second cylinder bank; an exhaust gas recirculation system including an exhaust gas recirculation passage positioned downstream from the second cylinder bank, the exhaust gas recirculation system further including an exhaust gas recirculation cooler; an engine cooling system configured to route engine coolant through the engine, the engine cooling system including an engine coolant radiator; and a passageway block including a first flow passage for routing exhaust gas from the first cylinder bank to the first turbine, a second flow passage for routing exhaust gas from the first turbine to the second turbine, a third flow passage for routing exhaust gas from the second cylinder bank to the exhaust gas recirculation passage, upstream of the exhaust gas recirculation cooler, and a fourth flow passage for routing the engine coolant from the engine to the engine coolant radiator. The fourth flow passage at least partially surrounds the third flow passage, and the third flow passage at least partially surrounds the second flow passage. Further, during operation of the engine, the system is configured for exhaust gas to flow through the second flow passage in a first direction, exhaust gas to flow through the third flow passage in a second direction, and engine coolant to flow through the fourth flow passage in the second direction, the second direction being opposite the first direction.

FIG. 2 shows one embodiment of the passageway block 210 for use in an engine system. In alternate embodiments, the passageway block 210 may not be used in an engine system. As such, the various passages and openings of the passageway block 210 may be coupled to different components. As such, different types of fluids may flow through the passages (e.g., flow passages) in varying directions. FIGS. 3-8, presented below, show a passageway block in more detail. In one example, the passageway block presented in FIGS. 3-8 may be included in an engine system, as shown in FIG. 2. In another example, the passageway block presented in FIGS. 3-8 may be included in various other systems. As such, similar components of the passageway block as described above in FIG. 2 may be includes in FIGS. 3-8, described below.

Figure 3:
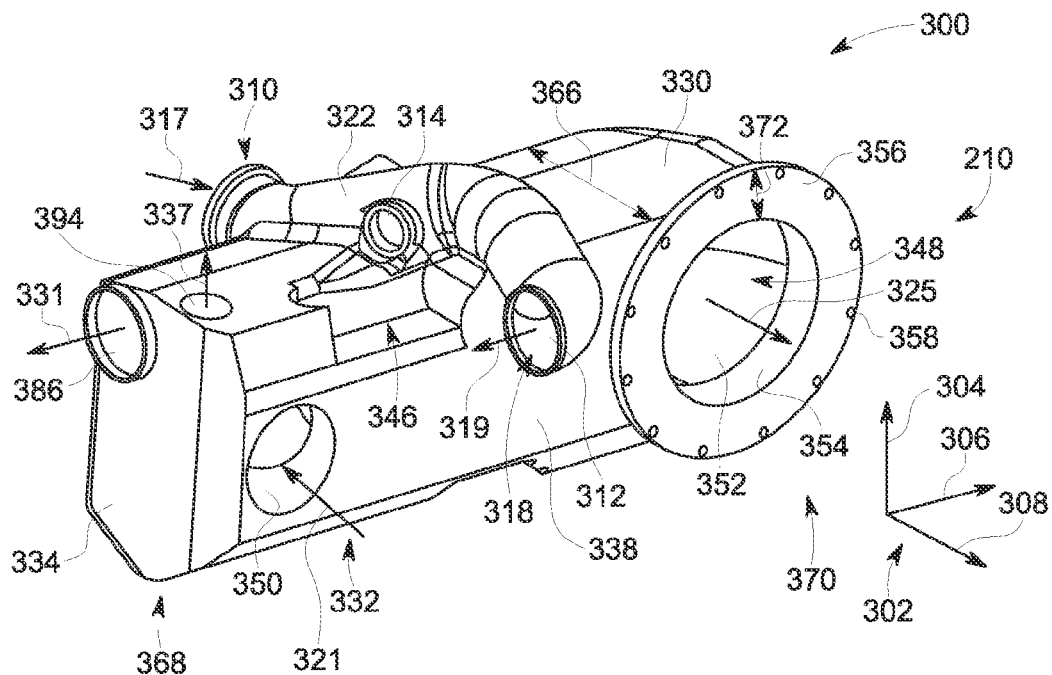
FIGS. 3-8 show schematics of a passageway block according to an embodiment of the invention.
Figure 4:
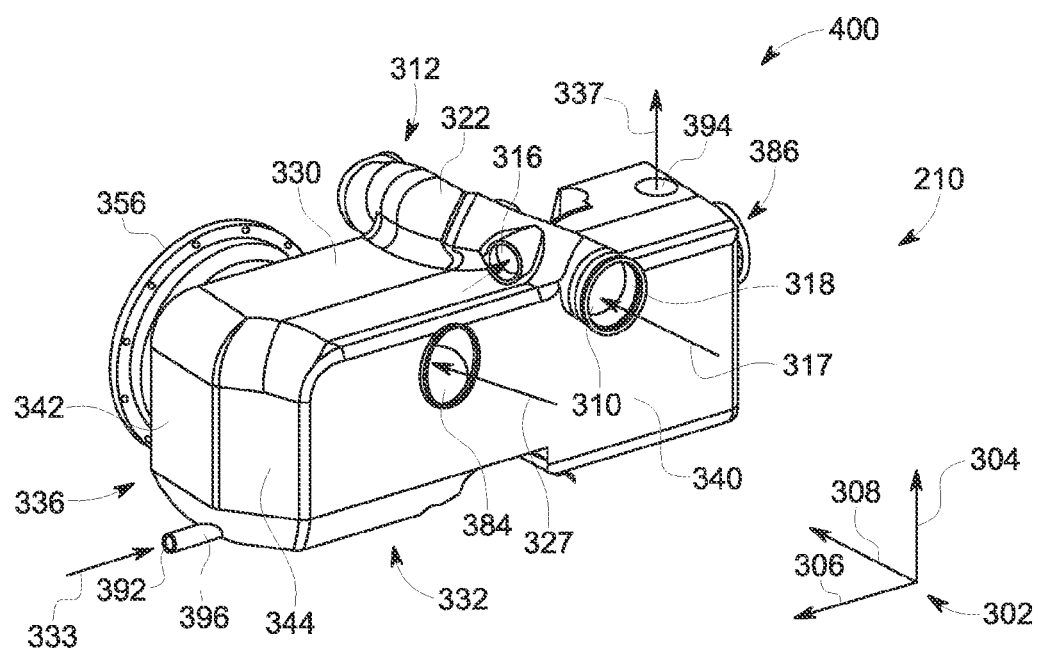
Figure 5:
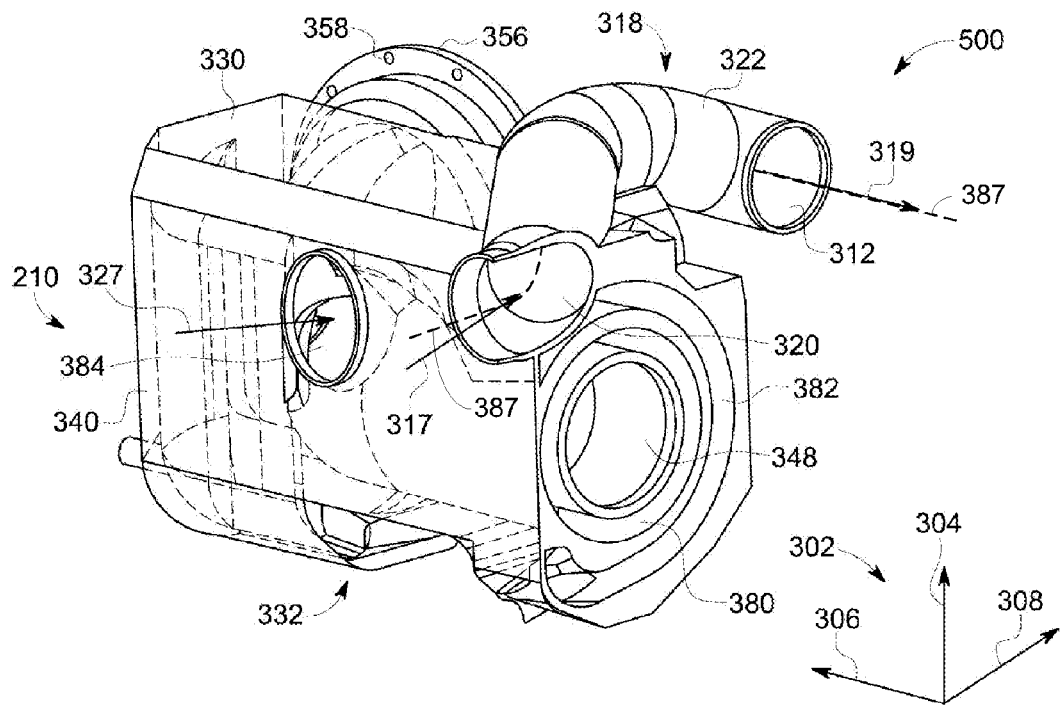
Figure 6:
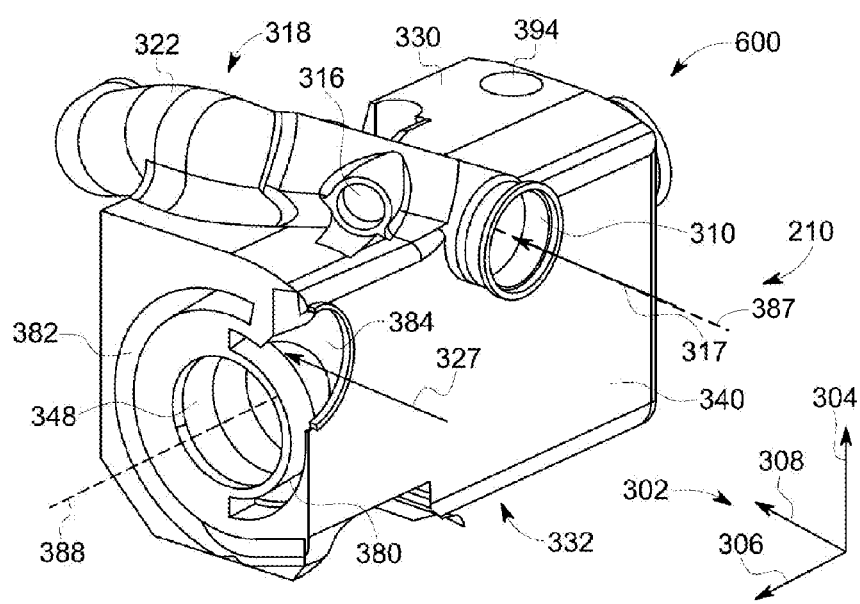

Turning now to FIGS. 3-8, two isometric views (FIGS. 3-4) and four section views (FIGS. 5-8) of the passageway block 210 are shown. FIGS. 3-8 include a coordinate system 302 including a vertical axis 304, a horizontal axis 306, and a lateral axis 308. FIG. 3 includes a first isometric view 300 while FIG. 4 shows a second isometric view 400. The second isometric view 400 is rotated approximately 180 degrees, around the vertical axis 304, from the first isometric view 300. FIG. 5 includes a first end section view 500, FIG. 6 includes a second end section view 600, FIG. 7 includes a cross-section view 700, and FIG. 8 includes a top-down section view 800 of the passageway block 210.

As described above in the embodiment of the engine system, the passageway block 210 has a generally rectangular shape with a plurality of outer faces or walls. Further, the plurality of outer faces or walls makes up three sets of opposite faces. For example, a first wall 330 (e.g., top face) and a second wall 332 (e.g., bottom face) are opposite to one another in a plane defined by the horizontal axis 306 and the lateral axis 308. A third wall 334 (e.g., first side face) and a fourth wall 336 (e.g., second side face) are opposite to one another in a plane defined by the vertical axis 304 and the lateral axis 308. Finally, a fifth wall 338 (e.g., back face) and a sixth wall 340 (e.g., front face) are opposite to one another in a plane defined by the vertical axis 304 and the horizontal axis 306. The walls presented in FIGS. 3-8 may correspond to the walls presented in FIG. 2.

In alternate embodiments, the passageway block 210 may not be rectangular. For example, as discussed above with reference to FIG. 2, the passageway block 210 may be cuboidal, elliptical, rounded, or the like. As such, in some examples, the sides or outer faces of the passageway block 210 may not be flat. In one example, the sides may be rounded. In another example, the passageway block 210 may have continuous surfaces with no defined walls.

As shown in FIGS. 3-8, the walls of the passageway block 210 join at various edges. Some of these edges are chamfered and/or rounded. In alternate embodiments, none of the edges may be chamfered or rounded. Further, some of the walls are made up of one or more surface and/or include cutout sections. These cutout sections and/or surfaces may be shaped such that the passageway block 210 fits within a designated system, such as the engine system 100 in FIGS. 1-2. For example, as shown in FIG. 4, the fourth wall 336 includes a first surface 342 and a second surface 344. The first surface 342 and second surface 344 are joined at a chamfered edge. In another example, the first surface 342 and the second surface 344 may be joined at a rounded edge. Further, the first surface 342 and the second surface 344 of the fourth wall 336 join the first wall 330 at two rounded edges and join the second wall 332 at two more rounded edges. The second surface 344 of the first wall 330 joins the sixth wall 340 at an additional rounded edge. The sixth wall 340 is also joined to the first wall 330 at yet another rounded edge. As shown in FIG. 3, the first wall 330 and the fifth wall 338 are joined near the third wall 334 at a chamfered edge and joined near the fourth wall 336 at a non-chamfered, 90 degree angle edge. Further, a section 346 is removed from the first wall 330 and the fifth wall 338, between the chamfered edge and the non-chamfered edge. The section 346 includes one flat and three curved edges.

In alternate embodiments, the edges described above may or may not be chamfered. Additionally, the described walls may have greater or fewer surfaces than described above. For example, in an alternate embodiment, the fourth wall 336 may include only one surface (e.g., the first surface 342 and the second surface 344 may be continuous or one surface). In yet other embodiments, the passageway block 210 may include more or less cutout sections (such as section 346) depending upon an application and space provided for installing the passageway block 210 in a designated system.

Returning to FIGS. 3-8, the passageway block 210 also includes a plurality of openings and passages. In one example, the passages may be fluidic passages. Specifically, the passageway block 210 includes a first opening 310, a second opening 312, a third opening 314, and a fourth opening 316. The passageway block 210 further includes a first passage 318 (which may correspond to the first flow passage 233 shown in FIG. 2). The first passage 318 extends between the first opening 310 and the second opening 312. As such, the first passage 318 is a hollow cylinder having a first inner surface 320 and a first outer surface 322. Further, the first passage 318 is coupled to the passageway block 210 at the first wall 330. Specifically, the first outer surface 322 of the first passage 318 is integrated into the first wall 330 through two rounded edges or fillets, one fillet on each side of the outer surface 322. In this way, the convex outer surface 322 of the first passage 318 connects to the first wall 330 through the fillets along a width 366 of the passageway block 210, with respect to the lateral axis 308, of the first wall 330. In an alternate embodiment, the first passage 318 may not connect to the first wall 330 through fillets. For example, the first passage 318 may be coupled to the first wall 330 at the outer surface 322 of the first passage 318.

Further still, the first passage 318 extends fully from the first opening 310, across the width 366 of the first wall 330, and to the second opening 312 without interruption. As such, a distance between the first opening 310 and the second opening 312, along the first passage 318, defines a length of the first passage 318. The first passage 318 includes multiple bends or curves such that the cylinder or passage is not straight. The first opening 310 is parallel to the sixth wall 340 while the second opening 312 is parallel to the third wall 334 and perpendicular to the fifth wall 338. As such, the first opening 310 is perpendicular to the second opening 312. In an alternate embodiment, the first passage 318 may not include bends or curves, such that the cylinder or passage is straight. In this embodiment, the second opening 312 may also be parallel to the sixth wall 340. In yet another embodiment, the first passage 318 may include one curve near the second opening 312 such that the second opening 312 is perpendicular to the first opening 310 while the rest of the first passage 318 is straight.

The third opening 314 and fourth opening 316 are positioned along the length of the first passage 318, between the first opening 310 and the second opening 312. As such, the third opening 314 and the fourth opening 316 may be first and second branch openings, respectively. For example, additional branches, passages and/or bypass conduits may be fluidically coupled to the first passage 318 through the third opening 314 and/or the fourth opening 316. The third opening 314 is closer to the second opening 312 while the fourth opening 316 is closer to the first opening 310. As such, the third opening 314 and the fourth opening 316 are spaced a distance apart along the length of the first passage 318. Further, the third opening 314 and the fourth opening 316 face opposite directions and are relatively parallel to one another. As such, the third opening 314 extends outwardly from the first passage 318 relatively toward the third wall 334 while the fourth opening 316 extends outwardly from the first passage 318 relatively toward the fourth wall 336.

The first opening 310 has a first diameter and the second opening 312 has a second diameter, the first diameter and the second diameter being substantially equal. Similarly, the third opening 314 has a third diameter and the fourth opening 316 has a fourth diameter, the third diameter and the fourth diameter being substantially equal. Further, the third diameter and the fourth diameter are smaller than the first diameter and the second diameter.

In one example, the first passage 318 may be a first flow passage with a fluid flowing into the first opening 310, through the first passage 318, and out the second opening 312. As such, the first opening 310 may be an inlet of the first passage 318 and the second opening 312 may be an outlet of the first passage 318. In some cases, fluid may flow out the third opening 314, from the first passage 318. In other examples, fluid may additionally flow into the first passage 318 through the fourth opening 316. As described with reference to FIG. 2 above, in one example, the fluid flowing through the first passage 318 may be an exhaust gas traveling from an exhaust manifold of an engine to a turbine of a high pressure turbocharger, such as the high pressure turbocharger 242 shown in FIG. 2. In this example, exhaust gas from an EGR bypass passage (such as EGR bypass passage 234 shown in FIG. 2) may flow into the first passage 318 through the fourth opening 316. Additionally, exhaust gas within the first passage 318 may flow out the third opening 314 and into a turbine bypass passage (such as the turbine bypass passage 270 shown in FIG. 2).

The first passage 318 may be an exterior passage of the passageway block 210. As shown in FIGS. 3-8, the passageway block 210 also includes a plurality of interior, concentric passages positioned within the passageway block 210. The plurality of concentric passages including a second passage 348 positioned within the passageway block 210 and surrounded by a third passage 380 and a fourth passage 382, the fourth passage 382 surrounding the third passage 380. As such, a central axis 387 of the first passage 318 is positioned closer to an exterior of the passageway block 210 than a central axis 388 of the second passage 348.

The second passage 348 extends fully without interruption between a fifth opening 350 and a sixth opening 352, the fifth opening 350 and the sixth opening 352 positioned near opposite ends of one of the passageway block 210. The fifth opening 350 is positioned at a first end 368 of the passageway block 210 and the sixth opening 352 is positioned at as second end 370 of the passageway block 210. Specifically, the fifth opening 350 is positioned in the back face (e.g., fifth wall 338) and proximate to the first side face (e.g., third wall 334). The sixth opening 352 is positioned in the back face and proximate to the second side face (e.g., fourth wall 336). Further, the fifth opening 350 and the sixth opening 352 are both parallel to the fifth wall 338.

Figure 8:
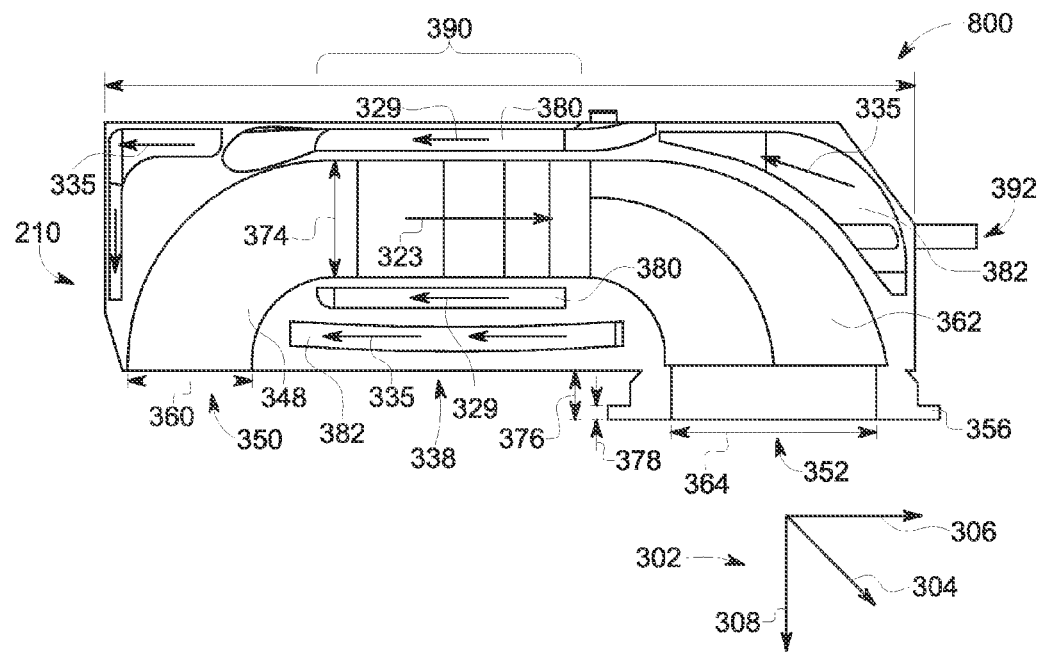

As best seen in FIG. 8, the fifth opening 350 has a fifth diameter 360 and the sixth opening 352 has a sixth diameter 364. The sixth diameter 364 is larger than fifth diameter 360. The sixth diameter 364 of the sixth opening 352 is larger than the diameters of all the other openings in the passageway block 210. In alternate embodiments, the sixth opening 352 may not be the largest opening in the passageway block 210.

As shown in FIGS. 5-8, the second passage 348 is a main bore through an inside of the passageway block 210. As such, the second passage 348 is a centralized passage with additional interior passages surrounding the second passage 348 (additional passages discussed further below). Specifically, the central axis 388 of the second passage 348 is positioned proximate to a center of the passageway block 210. Further, the central axis 388 of the second passage 348 is substantially the same as a central axis of the third passage 380 and a central axis of the fourth passage 382. As such, the central axis 388 may be a common axis for the second passage 348, the third passage 380, and the fourth passage 382.

The second passage 348 has a second passage diameter 374 substantially equal to the fifth diameter 360. The second passage 348 includes an expansion section 362, proximate to the sixth opening 352, in which the diameter of the passage increases from the fifth diameter 360 (or the second passage diameter 374) to the sixth diameter 364. In other words, the second passage diameter 374 expands from the fifth diameter to the sixth diameter.

The fifth opening 350 is positioned in the fifth wall 338 at a first end of the second passage 348 while the sixth opening 352 is positioned at a second end of the second passage 348. Proximate to the second end of the second passage 348, the second passage 348 extends outwardly, by a distance 376, from the fifth wall 338 to the sixth opening 352.

As seen in FIG. 3, the sixth opening 352 includes a lip or ledge 354. Further, a flange 356 extends around a circumference of the sixth opening 352. The flange 356 has a width 372 extending from an inner edge, defined by the sixth opening 352, to an outer edge. The flange is further defined by a thickness 378 (shown in FIG. 8). Further, the flange 356 includes a plurality of holes 358 around the circumference of the flange 356, near the outer edge. The holes 358 may be included for fastening or fixing the flange 356 to another part. In one example, as shown in FIG. 2, the flange 356 may be fixed to an inlet 252 of the low pressure turbine.

In one example, the second passage 348 may be a second flow passage with a fluid flowing into the fifth opening 350, through the second passage 348, and out the sixth opening 352. As such, the fifth opening 350 may be an inlet of the second passage 348 and the sixth opening 352 may be an outlet of the second passage 348. As described with reference to FIG. 2 above, in one example, the fluid flowing through the second passage 348 may be an exhaust gas traveling from a turbine of a high pressure turbocharger to a turbine of a low pressure turbocharger, such as the high pressure turbocharger 242 and the low pressure turbocharger 240 shown in FIG. 2.

The third passage 380 of the passageway block 210 extends fully without interruption between a seventh opening 384 and a eighth opening 386. The seventh opening 384 and the eighth opening 386 are positioned in adjoining sides or walls of the passageway block 210. Specifically, the seventh opening 384 is positioned in the sixth wall 340 (e.g., front face) and the eighth opening 386 is positioned in the third wall 334 (e.g., first side face). As such, the seventh opening 384 is perpendicular to the eighth opening 386. As shown in FIGS. 3-7, the seventh opening 384 and the eighth opening 386 are positioned vertically closer to the first wall 330 than the second wall 332. Further, the seventh opening 384 has a seventh diameter and the eighth opening 386 has an eighth diameter, the seventh diameter and the eighth diameter being substantially equal. In an alternate embodiment, the seventh diameter and the eighth diameter may not be substantially equal.

As introduced above, the second passage 348, the third passage 380, and the fourth passage 382 are at least partially concentric passages. For example, the passages may be fully concentric, at 360 degrees, partially concentric, at less than 360 degrees, or some passages may be fully concentric and others partially concentric. Additionally, the passages are concentric for at least a portion of the passageway block 210. However, none of the inlets and outlets to the passages of the passageway block 210 are concentric with one another. For example, along a central portion 390 within the passageway block 210, the third passage 380 concentrically surrounds the second passage 348. Further, the central portion 390 is spaced away from edges or the first and second side walls of the passageway block 210. As such, along the central portion 390, the third passage 380 has a first inner diameter and a first outer diameter.

In one example, the third passage 380 may be a third flow passage with a fluid flowing into the seventh opening 384, through the third passage 380, and out the eighth opening 386. As such, the seventh opening 384 may be an inlet of the third passage 380 and the eighth opening 386 may be an outlet of the third passage 380. As described with reference to FIG. 2 above, in one example, the fluid flowing through the third passage 380 may be a recirculated exhaust gas traveling from a donor cylinder exhaust manifold of an engine to an EGR cooler.

A cross-section of the third passage 380 transitions from circular at the inlet of the third passage 380 to annular at the central portion 390 through a first transition section. Similarly, the cross-section of the third passage 380 transitions from annular at the central portion 390 to circular at the outlet of the third passage 380 through a second transition section.

The fourth passage 382 of the passageway block 210 extends fully without interruption between a ninth opening 392 and a tenth opening 394. The ninth opening 392 is positioned in the second side face (e.g., fourth wall 336) and vertically closer (with respect to the vertical axis 304) to the bottom face of the passageway block 210. The tenth opening 394 is positioned in the top face (e.g., first wall 330) and horizontally closer (with respect to the horizontal axis 306) to the first side face (e.g., the third wall 334). As such, the ninth opening 392 is perpendicular to the tenth opening 394. Further, the ninth opening 392 has a ninth diameter and the tenth opening 394 has a tenth diameter, the ninth diameter being smaller than the tenth diameter.

The fourth passage 382 concentrically surrounds the third passage 380 along the central portion 390 within the passageway block 210. As such, along the central portion 390, the fourth passage 382 has a second inner diameter and a second outer diameter. The first inner diameter of the third passage 380 is larger than the second passage diameter 374 of the second passage 348 and the second inner diameter of the fourth passage 382 is larger than the first outer diameter of the third passage 380. In this way, the fourth passage 382 concentrically surrounds the third passage 380, and the third passage 380 concentrically surrounds the second passage 348 along the central portion 390 within the passageway block 210.

In one example, the fourth passage 382 may be a fourth flow passage with a fluid flowing into the ninth opening 392, through the fourth passage 382, and out the tenth opening 394. As such, the ninth opening 392 may be an inlet of the fourth passage 382 and the tenth opening 394 may be an outlet of the fourth passage 382. Further, the inlet of the fourth passage 382 may include an inlet conduit 396 which extends outwardly from the third wall 334 to the ninth opening 392. As described with reference to FIG. 2 above, in one example, the fluid flowing through the fourth passage 382 may be engine coolant traveling from the engine to an engine coolant radiator.

A cross-section of the fourth passage 382 transitions from circular at the inlet to the fourth passage 382 to annular at the central portion 390 through a third transition section. Similarly, the cross-section of the fourth passage 382 transitions from annular at the central portion 390 to circular at the outlet of the fourth passage 382 through a fourth transition section.

In this way, a passageway block may comprise a first passage and a second passage, each of the first passage and the second passage including respective inlets and outlets to the passageway block, none of the inlets and outlets being concentric with one another; but, within the passageway block, for at least a portion, a third passage at least partially concentrically surrounds the second passage. The passageway block further includes a first set of opposite faces, the first set of opposite faces including a front face and a back face, a second set of opposite faces, the second set of opposite faces including a top face and a bottom face, and a third set of opposite faces, the third set of opposite faces including a first side face and a second side face. A central axis of the first passage is positioned closer to an exterior of the passageway block than a central axis of the second passage, the first passage extending across a width of the top face of the passageway block.

The first passage of the passageway block extends between a first opening and a second opening, the first opening having a first diameter and the second opening having a second diameter, the first diameter and the second diameter being substantially equal. The first passage further includes a third opening and a fourth opening spaced a distance apart from one another and positioned along a length of the first passage, between the first opening and the second opening. The third opening and the fourth opening are parallel to one another and are positioned on opposite sides of the first passage from one another.

The second passage of the passageway block extends between a fifth opening and a sixth opening, the fifth opening positioned in the back face and proximate to the first side face of the passageway block and the sixth opening positioned in the back face and proximate to the second side face of the passageway block. Further, a flange extends around a circumference of the sixth opening, the flange having a plurality of holes. The fifth opening has a fifth diameter and the sixth opening has a sixth diameter, the sixth diameter being larger than the fifth diameter. The second passage also includes an expansion section proximate the sixth opening wherein a passage diameter of the second passage expands from the fifth diameter to the sixth diameter.

A fourth passage of the passageway block at least partially concentrically surrounds the third passage along a central portion within the passageway block. Cross-sections of the third passage and the fourth passage transition from circular at inlets and outlets to the third passage and the fourth passage to annular at the central portion through transition sections. Further, the third passage extends between a seventh opening positioned in the front face and an eighth opening positioned in the first side face. The fourth passage extends between a ninth opening positioned in the second side face and a tenth opening positioned in the top face.

As described above with reference to FIGS. 3-8, each passage has an inlet and outlet to the passageway block 210. Each inlet and outlet is unique to each passageway (e.g., none are concentric). In alternate embodiments, the inlets and outlets described above may be reversed (e.g., inlets are outlets). Further, the diameter sizes of the openings of the passages may be sized to fit chosen conduits.

Referring to FIGS. 3-8 with reference to FIGS. 1-2, in one embodiment, the passageway block described above may be installed in an engine system, such as the engine system shown in FIGS. 1-2. In this embodiment, when the engine is in operation, a non-recirculated, pre-turbine portion of an exhaust gas flows through the first passage 318 of the passageway block 210. The exhaust flow through the first passage 318 is shown by arrow 317 and arrow 319. Specifically, exhaust gas from a first cylinder bank of an engine (such as the first cylinder bank 109 shown in FIG. 1) flows into the first passage 318 at arrow 317, through the first passage 318, out the first passage 318 at arrow 319, and to a first turbine of a first turbocharger (such as first turbine 125 of first turbocharger 124 shown in FIG. 1 and high pressure turbocharger 242 shown in FIG. 2).

A non-recirculated, post-turbine portion of the exhaust gas flows through the second passage 348 of the passageway block 210. The exhaust flow through the second passage 348 is shown by arrow 321, arrow 323, and arrow 325. Specifically, exhaust gas from the first turbine of the first turbocharger flows into the second passage 348 at arrow 321, through the second passage 348 (shown at arrow 323), out the second passage 348 at arrow 325, and to a second turbine of a second turbocharger (such as the second turbine 121 of the second turbocharger 120 shown in FIG. 1 and the low pressure turbocharger 240 shown in FIG. 2).

A recirculated portion of the exhaust gas flows through the third passage 380 of the passageway block 210. The exhaust flow through the third passage 380 is shown by arrow 327, arrow 329, and arrow 331. Specifically, exhaust gas from a second cylinder bank (such as the second cylinder bank 111 shown in FIG. 1) including donor cylinders flows into the third passage 380 at arrow 327, through the third passage 380 (shown at arrow 329), out the third passage 380 at arrow 331, and to an exhaust gas recirculation passage (such as the exhaust gas recirculation passage 162 shown in FIG. 1), upstream of an exhaust gas recirculation cooler (such as the EGR cooler 166 shown in FIG. 1).

Finally, engine coolant from an engine cooling system (such as the engine cooling system 150 shown in FIG. 1) flows through the fourth passage 382 of the passageway block 210. The coolant flow through the fourth passage 382 is shown by arrow 333, arrow 335, and arrow 337. Specifically, engine coolant from the engine (such as engine 104 shown in FIG. 1) flows into the fourth passage 382 at arrow 333, through the fourth passage 382 (shown at arrow 335), out the fourth passage 382 at arrow 337, and to an engine coolant radiator (such as the engine coolant radiator 152 shown in FIG. 1) in the engine cooling system.

Figure 9:
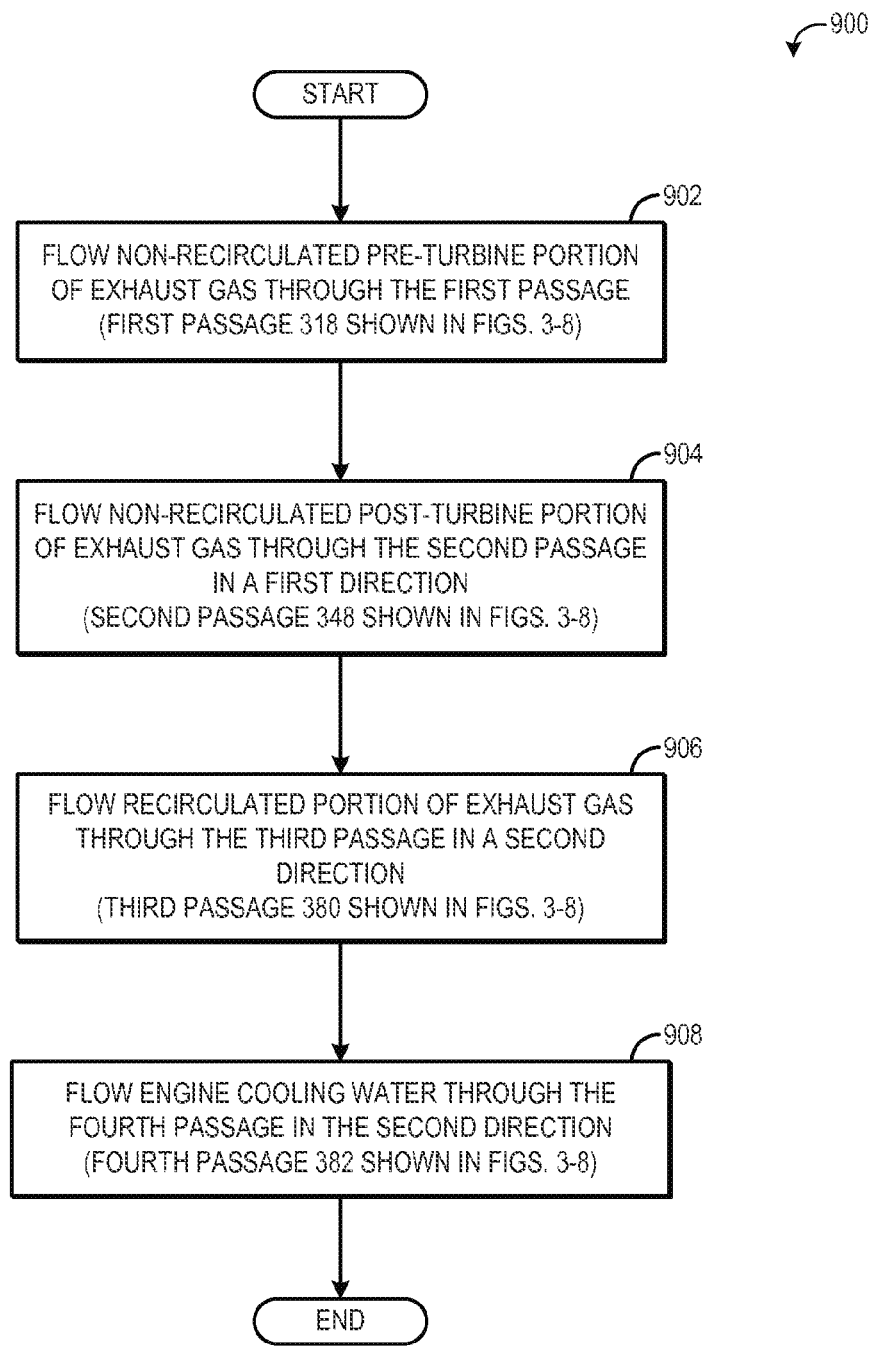
FIG. 9 shows a flow chart of a method for flowing engine fluids through the passageway block according to an embodiment of the invention.

FIG. 9 shows a method 900 (e.g., method for operating an engine) for flowing engine fluids through the passageway block. As described above, the passageway block shown in FIGS. 2-8 may be installed in an engine system. As shown in FIG. 2, exhaust gases may flow through the passages of the passageway block from one engine component to another. Further, engine coolant may also pass through a passage of the passageway block. Thus, the method 900 is for flowing these various engine fluids through the various passages of the passageway block.

At 902, the method includes flowing a non-recirculated pre-turbine portion of an exhaust gas through a first passage (such as first passage 318 shown in FIGS. 3-8) of a passageway block (such as the passageway block 210 shown in FIGS. 2-8).

Figure 7:
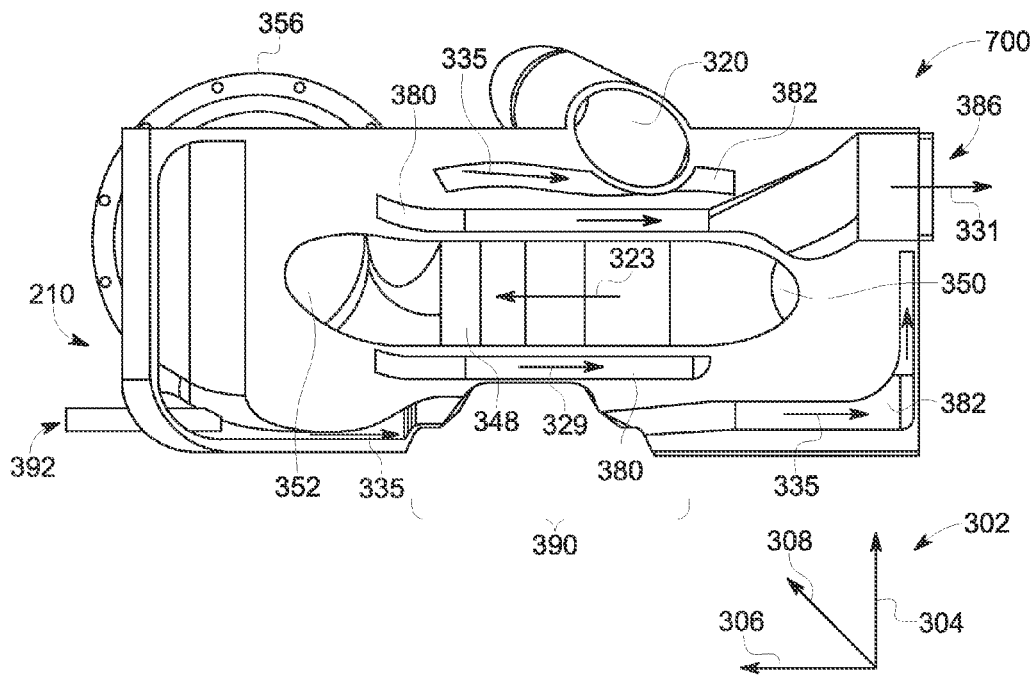

At 904, the method includes flowing a non-recirculated post-turbine portion of the exhaust gas through a second passage (such as the second passage 348 shown in FIGS. 3-8) of the passageway block in a first direction. The flow of the non-recirculated post-turbine portion of the exhaust gas in the first direction is depicted in FIGS. 7-8 by arrow 323.

At 906, the method includes flowing a recirculated portion of the exhaust gas through a third passage (such as the third passage 380 shown in FIGS. 3-8) of the passageway block in a second direction. The flow of the recirculated portion of the exhaust gas in the second direction is depicted in FIGS. 7-8 by arrow 329. As shown in FIGS. 7-8, the second direction is opposite the first direction.

At 908, the method includes flowing engine coolant through a fourth passage (such as the fourth passage 382) of the passageway block in a second direction. The flow of the engine coolant in the second direction is depicted in FIGS. 7-8 by arrow 327.

Heat transfer may occur between the fluids flowing through the flow passages of the passageway block. The opposite flow directions (e.g., first direction and second direction) described above may increase heat transfer between the fluids in the passages. For example, the recirculated portion of the exhaust gas traveling from the donor exhaust manifold to the EGR cooler, through the third passage, may be at a higher temperature than the non-recirculated post-turbine portion of the exhaust gas traveling from the high pressure turbine to the low pressure turbine, through the second passage. Thus, heat may transfer from the recirculated portion of the exhaust gas in the third passage to the non-recirculated post-turbine portion of the exhaust gas in the second passage through a wall surrounding the second passage and between the second passage and the third passage. As such, the temperature of the recirculated portion of the exhaust gas may decrease from the entrance to the exit of the passageway block while the temperature of the non-recirculated post-turbine portion of the exhaust gas may increase from the entrance to the exit of the passageway block. The increase in the temperature of the exhaust entering the low pressure turbine may increase the efficiency of the low pressure turbine. Further, the decrease in temperature of the recirculated exhaust gas traveling to the EGR cooler may reduce a heat rejection load on the EGR cooler. In turn, the reduction in heat rejection load may allow the size of the EGR cooler to be reduced.

Additionally, the engine coolant traveling from the engine to the engine coolant radiator, through the fourth passage, may be at a lower temperature than the recirculated portion of the exhaust gas traveling through the third passage. Thus, heat may transfer from the recirculated portion of the exhaust gas in the third passage to the engine coolant in the fourth passage through a wall surrounding the third passage and between the third passage and the fourth passage. As such, the temperature of the recirculated portion of the exhaust gas may further decrease when traveling through the third passage of the passageway block. As described above, less cooling may then be needed by the EGR cooler.

In addition to increasing heat transfer between fluids and increasing turbocharging efficiency, the passageway block may also reduce the reaction forces of the turbochargers. The exhaust gas forces may be contained within the passageway block as the exhaust gases pass from the high pressure turbocharger to the low pressure turbocharger.

The description above presents one possible embodiment for the passageway block. In an alternate embodiment, the flow directions through the passages of the passageway block may be different than as described above. For example, the flow directions described above may be reversed. As such, the inlets described above may become outlets and the outlets described above may become inlets.

In this way, a passageway block may include four passages, which may be flow passages, with each passage having a unique inlet and outlet to the passageway block. A first passage has a central axis positioned closer to an exterior of the passageway block than a central axis of a second passage. The second, third, and fourth passages may be at least partially concentric with one another, for at least a portion of the passageway block. In one embodiment, the passageway block may be installed in an engine system. As such, various exhaust flows and engine coolant flow may pass through the passages of the passageway block. Since the second, third, and fourth passages are concentric with one another, heat transfer may occur between the fluids flowing through these passages. In some cases, this may increase the turbocharging and cooling efficiency of the engine. In addition to increasing heat transfer between fluids and increasing turbocharging efficiency, the passageway block may also reduce the reaction forces of the turbochargers. Finally, the passageway block may allow for a reduction in the number of engine system components and exhaust leaks.

Another embodiment relates to a passageway block comprising a block body, and a first passage, a second passage, and a third passage defined by and extending through the block body. The first passage and the second passage define respective inlets and outlets to the block body. (None of the inlets and outlets are concentric with one another.) Within the block body, for at least a portion of their lengths, the third passage at least partially concentrically surrounds the second passage.

In another embodiment, the block body is monolithic (formed of a single piece of material), with the passages being molded into, machined from, or otherwise formed in the block body.

In another embodiment, the passageway block is part of a system comprising the passageway block and an engine system. The engine system includes an engine with first and second cylinder banks, first and second turbochargers having respective first and second turbines, and an EGR passage. The passageway block is configured such that when the block body is installed in conjunction with the engine system, the first passage connects the first cylinder bank and the first turbine, the second passage connects the first turbine with the second turbine, and the third passage connects the second cylinder bank to the EGR passage. In this embodiment, the block body of the passageway block may be monolithic. Alternatively, the block body may be other than monolithic.

In another embodiment, the passageway block further comprises a fourth flow passage defined by and extending through the block body. The passageway block is configured such that when it is installed in conjunction with the engine system, the fourth passage interconnects an engine coolant radiator with the engine, for routing coolant from the engine to the engine coolant radiator. The fourth passage may at least partially concentrically surround the third passage.

According to another aspect of a passageway block with a block body defining a first passage, a second passage, a third passage, and a fourth passage (as described above), the first passage, second passage, third passage, and fourth passage may be non-fluidly connected within the block body, meaning that fluid flowing through any of these passages would not flow to any of the other of these passages within the block body. (This does not preclude the passages from being fluidly connected outside the block body, such that a fluid flow through one passage would exit the block body and re-enter the block body for flow through a different one of the passages. Also, this does not preclude any of the first passage, second passage, third passage, and/or fourth passage from being fluidly connected within the block body to passages other than the first passage, second passage, third passage, and fourth passage, although in embodiments, none of the first passage, second passage, third passage, and fourth passages are fluidly connected within the block body to any other passages.) As noted above, in such embodiments, the block body may be monolithic.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A passageway block, comprising:
   a first passage and a second passage, each of the first passage and the second passage including respective inlets and outlets to the passageway block positioned at an exterior of the passageway block, none of the inlets and outlets being concentric with one another;
   within the passageway block, for at least a portion, a third passage at least partially concentrically surrounds the second passage, where a central axis of the second passage is a common axis to the second passage and third passage along the portion;
   wherein each of the respective inlets and outlets are unique to each of the first and second passage and further comprising a first set of opposite faces, the first set of opposite faces including a front face and a back face, a second set of opposite faces, the second set of opposite faces including a top face and a bottom face, and a third set of opposite faces, the third set of opposite faces including a first side face and a second side face; and
   wherein a central axis of the first passage is positioned closer to the exterior of the passageway block than the central axis of the second passage, the first passage extending across a width of the top face of the passageway block, and wherein the first passage is an exterior passage of the passageway block.

2. The passageway block of claim 1, wherein the first passage extends between a first opening and a second opening, the first opening having a first diameter and the second opening having a second diameter.

3. The passageway block of claim 2, wherein the first passage further includes a third opening and a fourth opening spaced a distance apart from one another and positioned along a length of the first passage, between the first opening and the second opening.

4. The passageway block of claim 3, wherein the third opening and the fourth opening are parallel to one another and are positioned on opposite sides of the first passage from one another.

5. The passageway block of claim 3, wherein the third opening extends outwardly from the first passage toward the first side face while the fourth opening extends outwardly from the first passage toward the second side face.

6. The passageway block of claim 2, wherein the first diameter and the second diameter are equal.

7. The passageway block of claim 1, wherein the third passage includes an inlet and outlet positioned at the exterior of the passageway block and wherein none of the inlets and outlets of the first passage, second passage, and third passage are concentric with one another.

8. The passageway block of claim 1, wherein the first passage, second passage, and third passage are non-fluidly connected within a block body of the passageway block, where fluid flowing through each of the first passage, second passage, and third passage does not flow to any other of the first passage, second passage, and third passage within the block body.

9. The passageway block of claim 1, wherein none of the first passage, second passage, and third passage are fluidly connected within a block body of the passageway block to any other passage.

10. The passageway block of claim 1, wherein an inner diameter of the third passage is greater than a diameter of the second passage along the portion.

11. A passageway block, comprising:
a first passage and a second passage, each of the first passage and the second passage including respective inlets and outlets to the passageway block positioned at an exterior of the passageway block, none of the inlets and outlets being concentric with one another;
within the passageway block, for at least a portion, a third passage at least partially concentrically surrounds the second passage; and
a first set of opposite faces, the first set of opposite faces including a front face and a back face, a second set of opposite faces, the second set of opposite faces including a top face and a bottom face, and a third set of opposite faces, the third set of opposite faces including a first side face and a second side face, wherein the second passage extends between a fifth opening and a sixth opening, the fifth opening positioned in the back face and proximate to the first side face of the passageway block and the sixth opening positioned in the back face and proximate to the second side face of the passageway block.

12. The passageway block of claim 11, wherein a flange extends around a circumference of the sixth opening, the flange having a plurality of holes.

13. The passageway block of claim 11, wherein the fifth opening has a fifth diameter and the sixth opening has a sixth diameter, the sixth diameter being larger than the fifth diameter.

14. The passageway block of claim 13, wherein the second passage includes an expansion section proximate the sixth opening wherein a passage diameter of the second passage expands from the fifth diameter to the sixth diameter.

15. A passageway block, comprising:
a first passage and a second passage, each of the first passage and the second passage including respective inlets and outlets to the passageway block positioned at an exterior of the passageway block, none of the inlets and outlets being concentric with one another;
within the passageway block, for at least a portion, a third passage at least partially concentrically surrounds the second passage, where a central axis of the second passage is a common axis to the second passage and third passage along the portion;
wherein each of the respective inlets and outlets are unique to each of the first and second passage and further comprising a first set of opposite faces, the first set of opposite faces including a front face and a back face, a second set of opposite faces, the second set of opposite faces including a top face and a bottom face, and a third set of opposite faces, the third set of opposite faces including a first side face and a second side face; and
wherein a fourth passage at least partially concentrically surrounds the third passage along a central portion within the passageway block and wherein the central axis of the second passage is a common axis to the second passage, the third passage, and the fourth passage along the central portion.

16. The passageway block of claim 15, wherein cross-sections of the third passage and the fourth passage transition from circular at inlets and outlets to the third passage and the fourth passage to annular at the central portion through transition sections.

17. The passageway block of claim 15, wherein the fourth passage extends between a ninth opening positioned in the second side face and a tenth opening positioned in the top face.

18. A passageway block, comprising:
a first passage and a second passage, each of the first passage and the second passage including respective inlets and outlets to the passageway block positioned at an exterior of the passageway block, none of the inlets and outlets being concentric with one another;
within the passageway block, for at least a portion, a third passage at least partially concentrically surrounds the second passage; and
a first set of opposite faces, the first set of opposite faces including a front face and a back face, a second set of opposite faces, the second set of opposite faces including a top face and a bottom face, and a third set of opposite faces, the third set of opposite faces including a first side face and a second side face, wherein a fourth passage at least partially concentrically surrounds the third passage along a central portion within the passageway block and wherein the third passage extends between a seventh opening positioned in the front face and an eighth opening positioned in the first side face.

* * * * *